Jan. 29, 1963 J. W. HEBB 3,075,682

TAPE DRIVE

Filed May 4, 1961 6 Sheets-Sheet 1

JAMES W. HEBB
INVENTOR.

BY Robert G. Clay

ATTORNEY

Jan. 29, 1963 J. W. HEBB 3,075,682

TAPE DRIVE

Filed May 4, 1961 6 Sheets-Sheet 2

JAMES W. HEBB
INVENTOR.

BY Robert G. Clay

ATTORNEY

Jan. 29, 1963 J. W. HEBB 3,075,682

TAPE DRIVE

Filed May 4, 1961 6 Sheets-Sheet 3

JAMES W. HEBB
INVENTOR.

BY Robert G. Clay

ATTORNEY

JAMES W. HEBB
INVENTOR.
BY Robert G. Clay
ATTORNEY

Jan. 29, 1963 J. W. HEBB 3,075,682

TAPE DRIVE

Filed May 4, 1961 6 Sheets-Sheet 5

JAMES W. HEBB
INVENTOR.

BY Robert G. Clay

ATTORNEY

JAMES W. HEBB
INVENTOR.
BY Robert S. Clay
ATTORNEY

United States Patent Office 3,075,682

Patented Jan. 29, 1963

3,075,682
TAPE DRIVE

James W. Hebb, Redwood City, Calif., assignor to Ampex Corporation, Redwood City, Calif., a corporation of California Filed May 4, 1961, Ser. No. 107,750
8 Claims. (Cl. 226—176)

This invention relates to tape transports and particularly to means for starting, driving and stopping tape in longitudinal motion.

Tape transports generally comprise a supply reel on which the tape is coiled for storage, a takeup reel on which the tape is coiled during processing, and a set of magnetic transducing heads engaging the tape between the two reels, together with a driven capstan and pinch roller for moving the tape past the heads at a constant precise longitudinal velocity. When the transport is one that is to be used in conjunction with a computer or data processing system, it is usually desired to be able to very quickly stop the tape and start it again, often in a reverse direction. Accordingly, a second capstan and associated pinch roller is supplied for driving the tape in the opposite direction. One of the capstans drives the tape in one driection while the other is disengaged as by retraction of its associated pinch roller; and when the tape is reversed, the first capstan is disengaged as by retraction of its associated pinch roller, and the second capstan is engaged.

The effectiveness of such a transport in use with very high speed computing and processing systems depends in part upon the speed with which the tape can be stopped and restarted. Stopping the tape is usually effected by application of a brake shoe directly on the tape. But in restarting the tape, there has heretofore been great difficulty in moving the pinch roller from its retracted position to its engaged position, even over a short distance, with sufficient speed and without causing an impact and bounce of the roller immediately after first engagement. Such a bounce decreases the effectiveness of the assembly in getting the tape up to speed, and in effect, operates to nullify the action by which it is produced, i.e., the speedy engagement of the roller itself.

The bouncing action of the pinch roller has been found also to produce rapid wear of the roller surface, to the extent that such rollers have to be replaced sometimes after only 24 hours of operation.

Another difficulty in existing devices of this class resides in the fact that they are not capable of accelerating the tape at precisely the maximum rate that the tape can physically withstand. In other words, these machines are uncontrollable, and either waste time in accelerating the tape too slowly, or accelerate too rapidly and overstrain the tape with possible breakage. It will be understood that only a short segment of tape in the immediate vicinity of the transducing heads needs to be accelerated, this segment generally being isolated by means of tape storage loops maintained on either side of the heads. The segment of tape has comparatively low mass and is therefore capable of being accelerated at a very high rate by forces applied locally thereto as by the capstan and pinch roller. The accelerating forces are applied at the leading end of the tape segment, and the mass of the trailing end constitutes a drag that tends to stretch the segment. The maximum acceleration rate of which the tape is inherently capable (i.e., the most efficient rate) is therefore the rate at which the limit of elasticity of the tape is approached. But some machines of the art are not capable of starting the tape at this rate because they are limited by the need for bringing the pinch roller itself to operating rotational speed. The pinch roller is inevitably of greater mass than the tape segment and is slower to accelerate; and the tape segment clearly cannot be brought to operating speed before the roller. Other machines of the art accelerate the tape too quickly and deform it. None of the previously known machines are controllable to accelerate the tape at the preferred rate.

Accordingly, it is an object of the present invention to provide a tape capstan and pinch roller assembly for driving a tape in longitudinal motion and particularly for starting the tape in such motion in a minimum amount of time.

It is another object of the present invention to provide a pinch roller that is brought from a retracted position to a position engaged with a tape and driven capstan in a minimum amount of time and remaining continuously thereafter in the engaged position without bouncing.

It is still another object of the invention to provide a tape driving capstan and pinch roller assembly in which some of the energy of the rotating capstan is stored in the pinch roller prior to engagement and is delivered to the tape upon engagement so as to accelerate the tape to operating speed in a shorter period of time.

It is a further object of the invention to provide a tape driving apparatus capable of starting a tape from a rest position and accelerating the tape to a longitudinal velocity on the order of 150 inches per second in less than three milliseconds of time.

It is a still further object of the present invention to provide a tape driving apparatus as above described and capable of starting the tape and bringing it accurately to within $\pm 5\%$ of the required operating speed within the described time requirement.

These and other objects are accomplished by the structure of the invention, in which a pinch roller is continuously rotated in all disengaged positions thereof and at a peripheral velocity in excess of the peripheral velocity of the capstan, so that upon engagement the pinch roller gives up energy of rotation to bring the tape quickly to its operating speed, the loss of energy in the pinch roller resulting in slowing down of the roller to the same peripheral velocity as that of the capstan; and the mechanism for engaging the pinch roller is operated so as to bring the roller into engagement with zero impact, so that there is no bounce and no consequent wastage of time in applying the accelerating energy to the tape. The operating mechanism is arranged to first impel the roller toward engaged position with very high velocity, second to brake the pinch roller with high deceleration so that it ends its movement without impact; and third to immediately reapply engaging forces to clamp the roller against the tape and capstan.

Other objects and advantages will be explained in the following specification, considered together with the accompanying drawings, in which.

Figure 1:
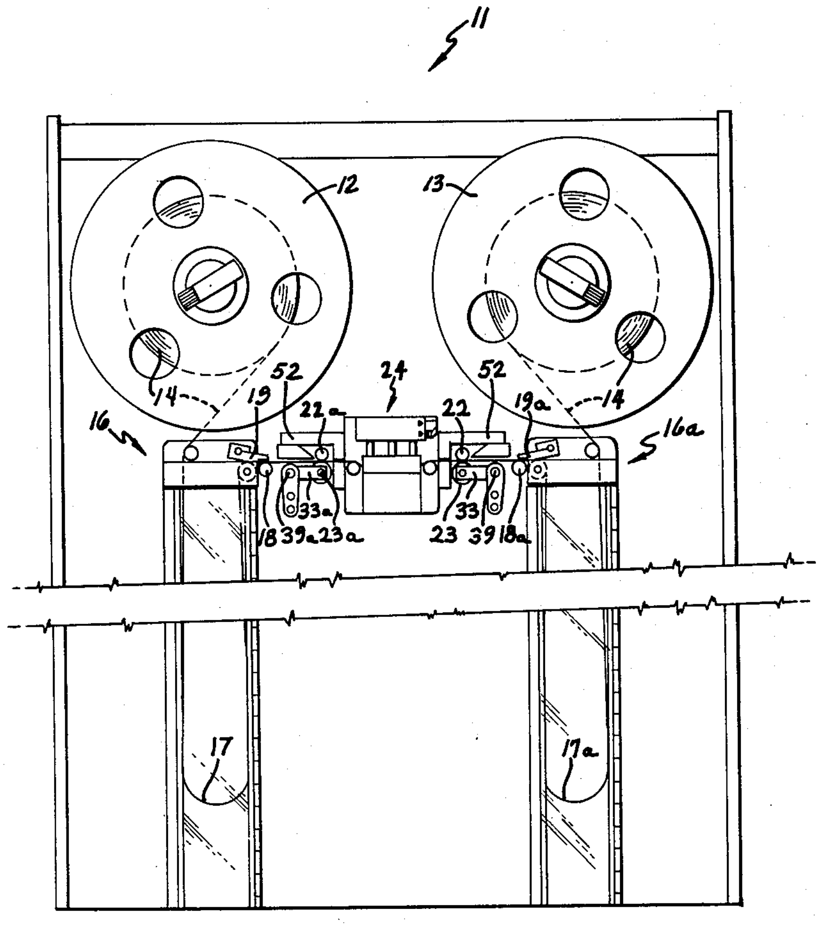
FIGURE 1 is a front elevation view of a tape transport constructed in accordance with the invention.
Figure 2:
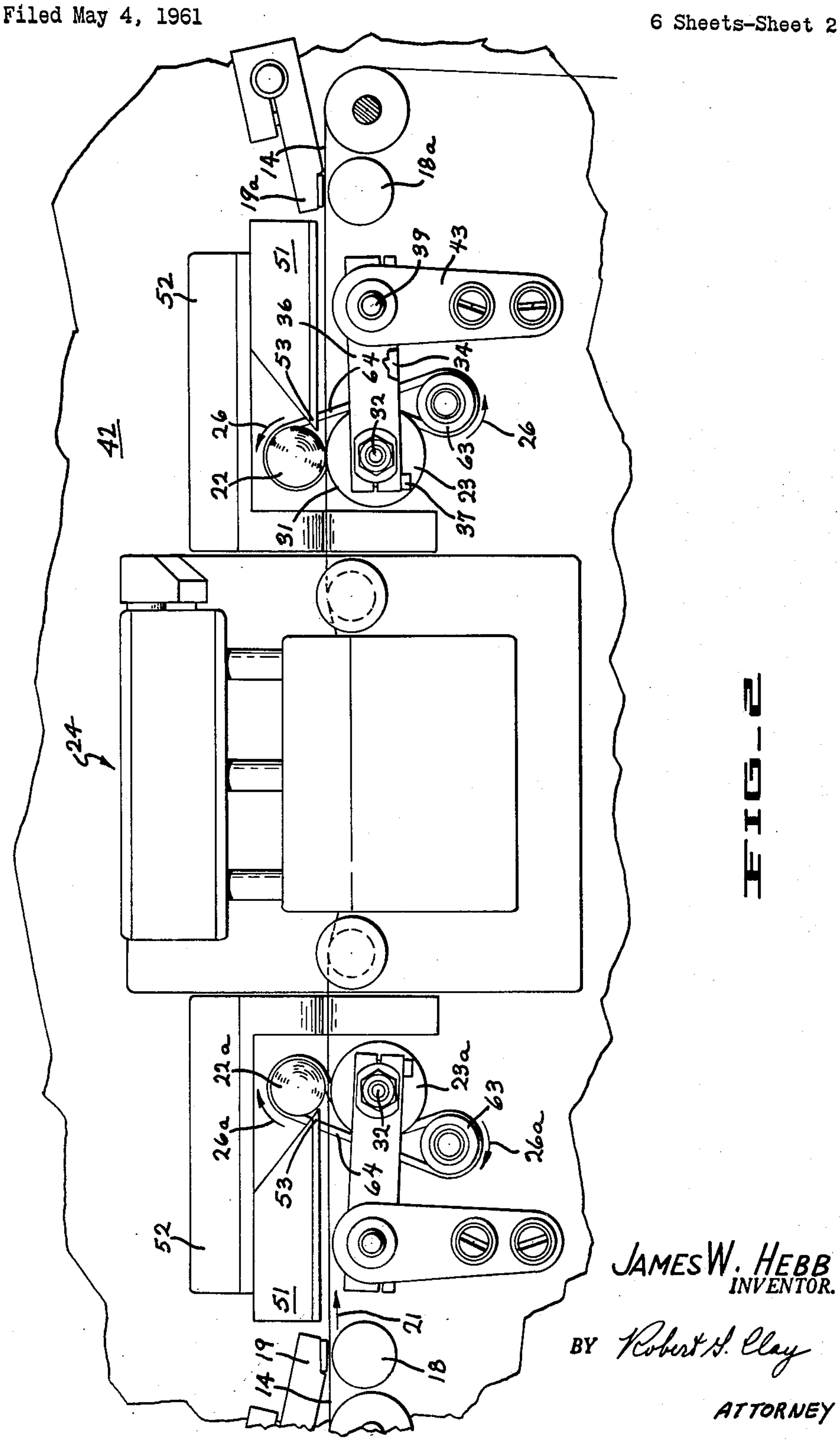
FIGURE 2 is an enlarged view of a portion of the apparatus shown in FIGURE 1.

Referring now to FIGURES 1 and 2 there is shown a tape transport 11 utilizing the invention. A pair of supply and takeup reels 12 and 13 are rotatably mounted for transport of a tape 14. The tape 14 is threaded from the supply reel 12 and into a tape loop column generally designated 16, such as is well known in the art. The tape 14 is kept in the column 16 in a variable length loop 17 so as to be maintained under constant tension even when the speed of the tape coming from the supply reel is different from the speed of the tape past the transducing apparatus, as during starting, stopping and reversing of the tape motion. From the column 16, the tape 14 is threaded between a guide 18 and brake 19, which may be actuated for quick stopping of the tape independently of the operation of the supply reel 12. During forward motion of the tape as indicated by the arrow 21 the brake 19 is disengaged. The tape is thence threaded between a reverse motion capstan 22*a* and pinch roller 23*a*, which is also retracted during forward motion of the tape. From the capstan 22*a* the tape is threaded through a transducing head assembly 24 and thence to a forward motion capstan 22 and pinch roller 23, which is engaged during forward motion of the tape. The tape is further threaded between a guide 18*a* and brake 19*a* to a second loop 17*a* in a column 16*a* and thence to the takeup reel 13. When the tape is moving forwardly, the takeup reel 12 is rotating in a counter-clockwise direction and is driven by the tension of the tape, though it is at the same time braked as by means well known in the art and not here shown. The takeup reel 13 is meanwhile rotating in the same counter-clockwise direction and is driven by motor means (not shown) operating independently of the capstan 22. The capstan 22 is operating continuously in the counter-clockwise direction as shown by the arrow 26, and the capstan 22*a* is driven continuously in a clockwise direction as shown by the arrow 26*a*, although in forward tape motion this capstan is not engaging the tape in driving relation because the pinch roller 23*a* is retracted.

When it is desired to reverse the motion of the tape 14, the pinch roller 23 is withdrawn to retracted position, the brake 19 is engaged to stop that portion of the tape to the right hand side of the brake; and the reels 12 and 13 are stopped as by application of braking means thereto. It is standard in the art that in such an operation the reels, being of great mass, cannot be stopped as quickly as the tape 14 that is passing through the transducing head assembly 24 can be stopped by the brake 19; and as a result the loop in column 16 momentarily grows longer, while the loop in column 16*a* grows shorter. When the stopping of the tape 14 is preliminary to reversing the motion of the tape, the next step is to release the brake 19 and to engage the pinch roller 23*a*. This action has the effect of accelerating the segment of tape 14 that is disposed between the capstan 22*a* and the lower portion of the loop 17*a* very quickly to operating speed, the speed being quickly attained because of the comparatively low mass of the tape in this segment. The reels 12 and 13 are concurrently caused to begin rotating in a clockwise direction so as to feed and takeup the tape 14 to the columns 16 and 16*a*; but again because the reels are of greater mass, they are slower to reach operating speed and as a result the tape loop in column 16*a* grows even shorter while the loop in column 16 grows even longer. However, after the reels have slightly over-reached the required operating velocity the tape loop lengths are re-established as approximately equal lengths.

Figure 3:
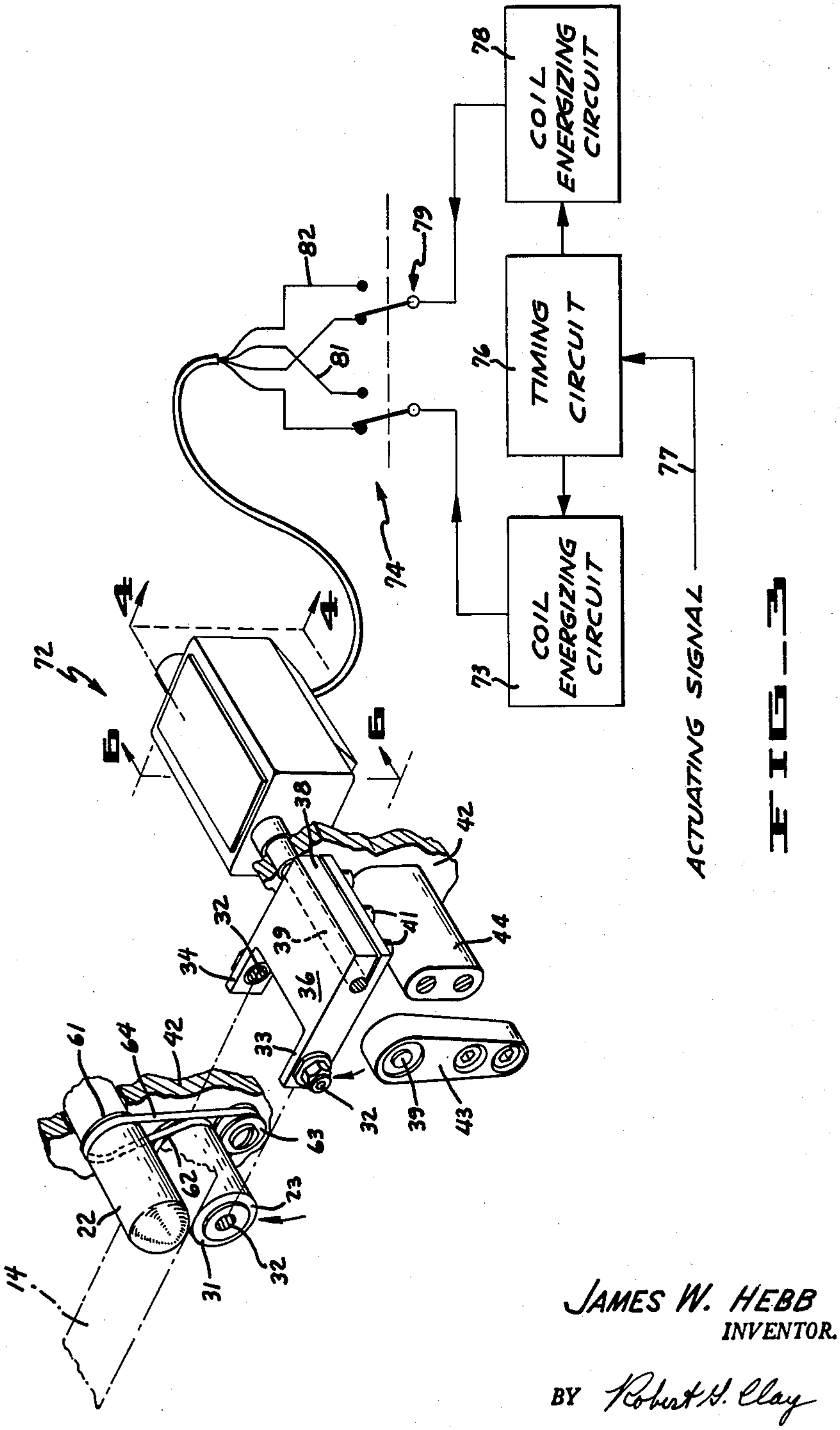
FIGURE 3 is a perspective exploded view to an intermediate scale of a portion of the apparatus shown in FIGURES 1 and 2, together with a schematic diagram of the operating circuit for the pinch roller.

Referring now to FIGURES 2 and 3, the pinch roller 23 is mounted generally as follows. The roller, which has a cylindrical resilient surface 31, is provided with an axle 32 on which the roller is mounted as by means of anti-friction bearings (not shown) for free rotation. The axle 32 is clamped between the extended arms 33 and 34 of a yoke member 36, the arms 33—34 each having bifurcated ends that are closed as by means of tightening bolts 37. The base portion 38 of the yoke is affixed to a shaft 39 and is clamped thereto as by means of bolts 41 extending through a bifurcated portion of the yoke. Thus, the roller 23 is mounted to be axially parallel with and swingable about the axis of the shaft 39 in conjunction with rotation of the shaft 39. The shaft 39 is mounted to extend through the top or front plate 42 of the apparatus, and the outwardly extending end of the shaft is supported as by means of a bracket 43 fixed at the ends of a bolted spacer 44. The bracket 43 gives greater rigidity to the structure.

An additional element shown in FIGURE 2 is a wedge member 51 mounted on a bracket 52 that is affixed to the head assembly 24. The purpose of this element is to prevent doubling up of the tape 14 coming off the capstan 22 in such a way that the tape becomes looped around the capstan. The wedge 51 has a knife edge 53 closely positioned adjacent to the capstan at the point where the tape 14 leaves the capstan and in effect operates when needed as a scraper to direct the tape downwardly and away from the rotating surface of the capstan 22.

As an important feature of the present invention, the pinch roller 23 is driven in the disengaged position at a peripheral speed somewhat greater than that of the capstan, so that when the roller is engaged with the capstan the roller is caused to slow down to the same peripheral velocity and the excess energy of rotation is given up to accelerate the tape to its operating velocity. To provide this effect, the capstan 22 and pinch roller 23 are each provided with drums or pulleys 61 and 62, and in the same plane is mounted a rotating idler pulley 63. Around the capstan drum 61 and the idler 63 is tightly looped a resilient drive belt 64, one shank of which is stretched around the pinch roller pulley portion 62. Thus as the capstan 22 rotates it drives the belt 64 and the belt 64 drives the pinch roller 23. The diameter of the pulley 62 on the pinch roller is less than the diameter of the resilient cylindrical surface 31 of the pinch roller, so that when the pinch roller is retracted it is driven at a peripheral velocity in excess of that of the capstan. In a preferred form of the invention, the parameters are so chosen that the retracted peripheral velocity of the pinch roller 23 is about ten percent greater than the peripheral velocity of the capstan 22. It will be seen however that when the pinch roller 23 is engaged with the capstan 22, the belt 64 is caused to slip with respect to the capstan and pinch roller so that the capstan and belt still directly supply the main driving force to the roller. Because of the resilience of the belt 64, the pinch roller pulley 62 is nevertheless continuously engaged with the belt in all of its possible positions.

To ensure that the excess rotational energy of the pinch roller 23 is delivered to the tape 14 without interruption or delay, the pinch roller actuating mechanism is adapted to engage the pinch roller without impact or bounce. In other words, the pinch roller 23 is operated to move from retracted to engaged position in an extremely short period of time and yet to arrive at the engaged position with substantially zero velocity so that it is stopped entirely by the actuating mechanism and not by contact with the tape 14 and capstan 22. The arcuate path of traverse of the pinch roller 23 in a preferred construction of the device is only .015 inch (exaggerated in the figure), but when it is considered that this comparatively massive physical object must be moved this distance within a time period of considerably less than a preferred parameter of three milliseconds, it will be seen that the task is not an easy one. Because the first part of the motion must be an accelerating motion from zero velocity and the last part of the motion must be a decelerating motion to zero velocity, it follows that, given a predetermined maximum value for acceleration and deceleration, the motion is best accomplished by accelerating the pinch roller 23 at maximum velocity for the first half of the distance and braking or decelerating the roller for the second half of the distance. To accomplish this process the actuating mechanism is arranged as follows.

A torsion spring bar 71 (FIGURE 4) is coupled to the shaft 39 and is arranged to urge the shaft to the retracted position of the pinch roller 23. An actuating coil 72 is electromagnetically coupled to the shaft 39 to urge the shaft to rotate the roller toward the engaged position. A coil energizing circuit 73 (FIGURE 3) is coupled to the coil 72 through a switch 74 and is energized through a timing circuit 76 that receives the initial actuating signal 77. The timing circuit 76 is arranged as well known in the art to energize the circuit 73 and the coil 72 for a predetermined period of time, the period of time being substantially one-half the time needed for the roller to traverse its path of .015 inch. At the end of this period of time the timing circuit 76 de-energizes the circuit 73 and coil 72 so that the roller coasts the balance of the distance to engaged position. But during the accelerating process, the shaft 39 has distended the spring 71, which is now loaded to slow down and stop the movement of the roller and eventually to return it to the retracted position. The spring 71 therefore brakes the roller during the second half of the motion and brings it to a stop precisely at the point of engagement with the tape and capstan. However at the instant of engagement it is desired to reapply the actuating force of the coil 72 to prevent the spring from returning the roller to retracted position. Accordingly, there is provided a second coil energizing circuit 78 also coupled to the coil 72 through a switch 79 and to the timing circuit 76. The timing circuit 76 is further arranged to energize the circuit 78 and re-energize the coil in precise time delay after the first de-energization of the coil so that at the instant of engagement the coil operates to clamp the pinch roller solidly against the tape and capstan.

Also as shown in FIGURE 3 a duplicate set of transmission leads 81 and 82 is provided leading from the switches 74 and 79 to a coil 72*a* for operating the pinch roller in a reverse direction, i.e., farther retracted as for use when it is desired to initially thread the tape on the machine. Details of this arrangement will be further explained below.

Figures 4, 5:
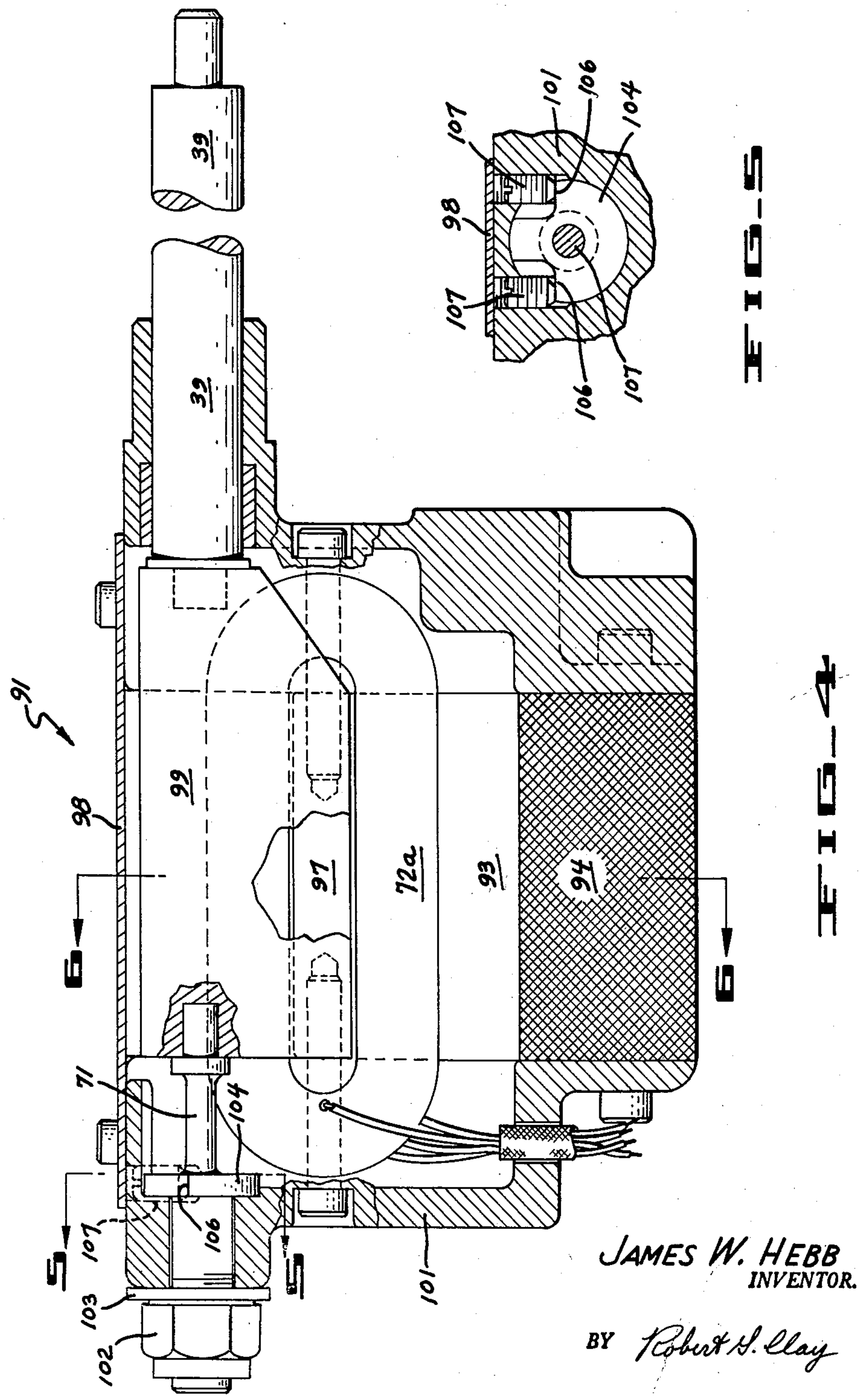
FIGURE 4 is a side elevation view, partly in section, and to an enlarged scale, of a portion of the apparatus shown in FIGURE 3.
FIGURE 5 is a fragmentary cross-sectional view taken along lines 5—5 of FIGURE 4.
Figure 6:
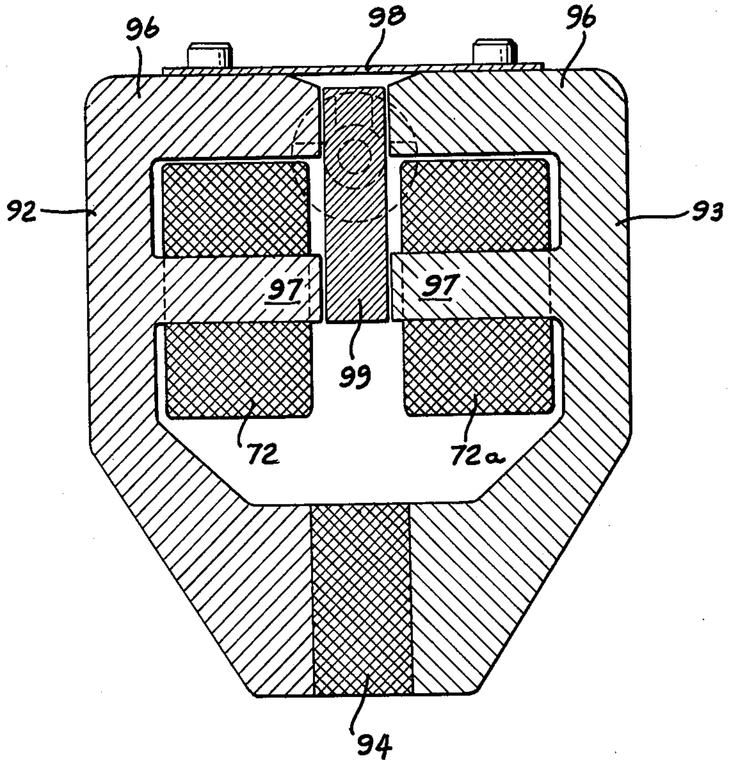
FIGURE 6 is a cross-sectional view taken along the lines 6—6 of FIGURE 4.

Referring now to FIGURES 4, 5 and 6, the construction of the coil 72 is shown in greater detail. A housing 91 is formed principally of a pair of pole piece elements 92 and 93, spaced apart and affixed to a permanent magnet 94. Each pole piece is engaged with one of the magnetic pole portions of the permanent magnet 94, and extends upwardly to an operating portion that includes a pair of parallel arms 96 and 97. The arms 96 and 97 of one pole piece are arranged in confronting spaced relation with respect to the arms of the other pole piece. A top plate 98 is secured to the respective arms 96 to form a cover and space the arms apart. Between the respective arms 96 and 97 is positioned an armature 99 that is formed of magnetically permeable material and is mounted on the shaft 39 for rotation between limiting positions engaging the arms of the pole pieces. The shaft 39 and axis of rotation of the armature 99 are closer to the arms 96 of the pole pieces than to the arms 97. The confronting tips of the arms 96 are spaced more closely together than are the confronting tips of the arms 97. As a result, the armature 99 when it is rotated to one limiting position, engages the arm 96 of one pole piece and the arm 97 of the other pole piece, thus forming a magnetic link between the respective pole pieces. It is understood that both of the arms of one pole piece are constrained to be North magnetic poles when both of the arms of the other pole pieces are South magnetic poles. Thus when the armature 99 is bridging respective arms of the two pole pieces the magnetic flux linked therethrough tends to maintain the armature in the bridging limiting position, this effect being opposite to the effect of the spring 71, which tends to return the armature to the retracted position on the pinch roller, or in other words to a neutral position in which the armature 99 is equi-spaced from all of the arms of the pole pieces (or vertical as shown in FIGURE 6). However in either limiting position of the armature, the spring force is stronger than the magnet force and the effect of the permanent magnet is only to oppose the spring force so that when additional force is used to hold the armature in engaged position this additional force does not have to be so great.

The spring 71 is here shown as a necked-down torsion spring element fixed to the armature 99 and forming an extension of the shaft 39 to anchor the shaft to a rear housing element 101, affixed to pole pieces 92—93. A self-locking torque nut 102 is threaded on the extending end of the spring element 71 and bears against the housing element 101 through a washer 103. A flange 104 formed on the spring element 71 bears against the inner side of housing element 101. The upper portion of flange 104 is provided with a pair of flats 106, on either side of the axis of the shaft, and a pair of adjusting screws 107 are threaded through the upper portion of element 101 to bear against the flats 106. The armature 99 is adjusted to its neutral central position by adjustment of the screws 107.

Beginning then from a neutral retracted position of the armature in vertical alignment and equi-distant spacing from the pole piece, the armature 99 is swung toward the limiting position as by energization of the coil 72 that is wound around the arm 97 of pole piece 92, the energization of the coil being as hereinbefore described. For moving the armature 99 in an opposite direction so as to retract the pinch roller for threading of the tape, a second coil 72*a* is wound around the arm 97 of pole piece 93, this coil being energized on the proper occasion through leads 81—82 as previously described. It will be seen that the armature 99 has a preferred direction of motion toward the particular arm 97 that corresponds with the coil that is energized, because the lever arm of the armature from the shaft 39 to the arm 97 is longer than the lever arm of the armature from the shaft 39 to the arm 96.

Figure 7:
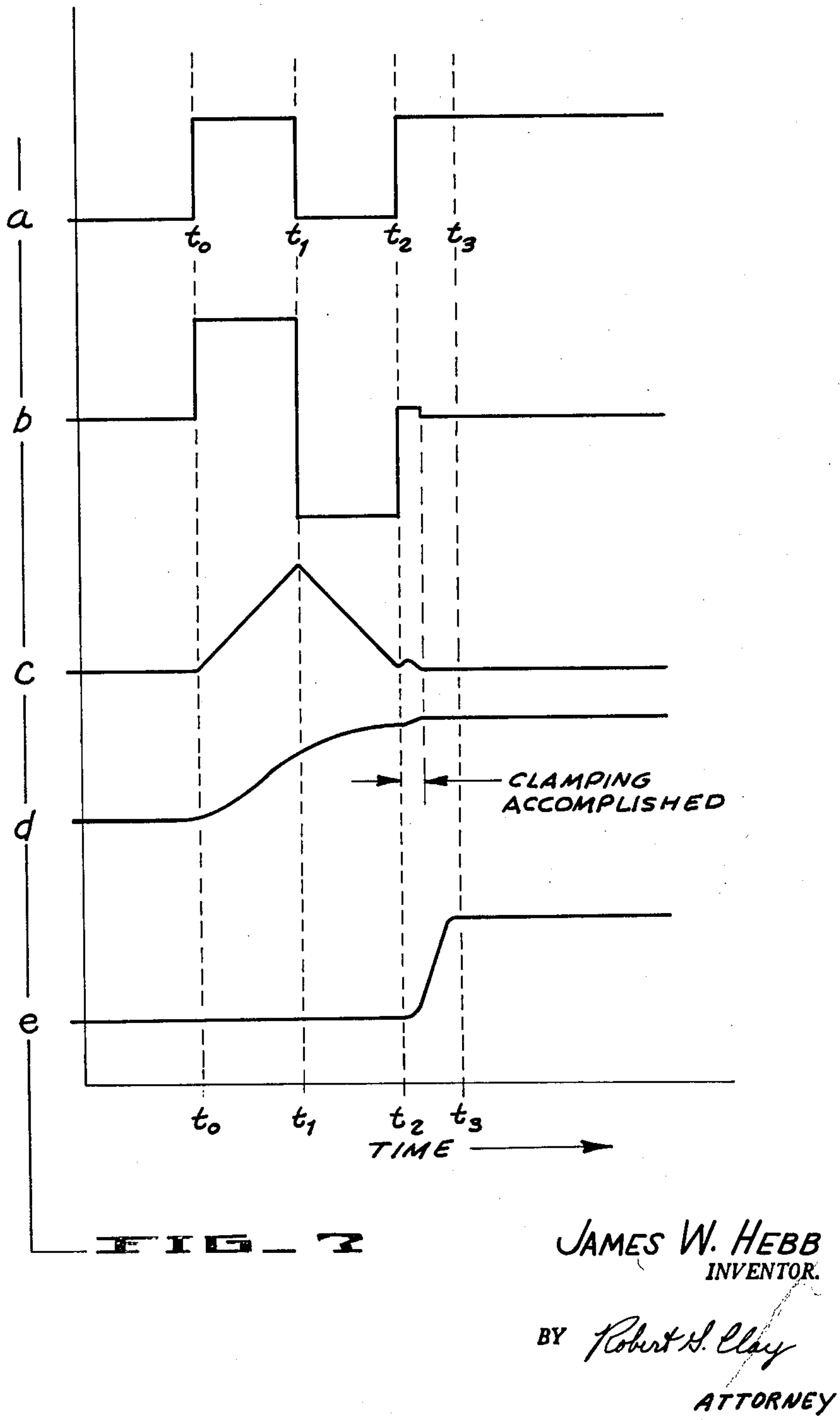
FIGURE 7 is a schematic diagram showing the operating sequence of the apparatus shown in FIGURES 2—3.

Referring now to FIGURE 7 the operation of the device is further explained. The curve shown in FIGURE 7*a* represents the operation of the timing circuit 76 in energizing the coil beginning with an application of voltage at time $T_0$ and lasting until time $T_1$, when the coil is de-energized. From time $T_1$ until time $T_2$ the coil remains de-energized while the pinch roller continues to move toward engaged position against the decelerating force of the spring 71. At $T_2$, the instant of engagement, the timing circuit re-energizes the coil and keeps it energized thereafter during the entire time that the pinch roller is to be engaged. However it will be seen that time $T_2$ is still substantially less than the time $T_3$ required to bring the tape up to operating speed.

FIGURE 7*b* illustrates the acceleration of the pinch roller with respect to the above times, the roller being positively accelerated from time $T_0$ to $T_1$, and being negatively accelerated (decelerated) from $T_1$ to $T_2$.

FIGURE 7*c* illustrates the corresponding velocity of the pinch roller which increases from time $T_0$ to $T_1$ and decreases to zero velocity from times $T_1$ to $T_2$. Between times $T_2$ and $T_3$ there is a slight return of velocity as the roller engages the tape and clamps it against the capstan.

FIGURE 7*d* illustrates the space motion of the roller between the retracted position at time $T_0$ and engaged position at time $T_2$. Between time $T_2$ and $T_3$ there is a further slight motion of the roller during the pinching process.

FIGURE 7*e* illustrates the acceleration of the tape during the process. Until the pinch roller arrives at the engaged position, at time $T_2$, the tape is not moved; it receives its entire acceleration to $\pm$ five percent of the desired operating velocity between time $T_2$ and $T_3$. It is noted that the maximum slope of the tape velocity curve between time $T_2$ and $T_3$ must be less than a certain limiting slope representing the maximum acceleration that can be applied to the tape without exceeding the tape limit of elasticity; but as provided in the preferred structure of the invention, the actual slope is well within the limit.

It will be understood that the pinch roller 22a and capstan 23a, together with the associated structure, is exactly similar to the corresponding capstan 22 and roller 23, and that the description given above describes both portions of the apparatus.

It will also be clear that the actuation of the brake elements 19 and 19a may be performed by means of similarly arranged coils and actuating circuits as here provided for the pinch rollers, so that the brake elements can be engaged without bounce or impact.

It is further noted that by means of the above described structure, pinch rollers of a class that previously had to be replaced every 24 hours because of wear have been found in test structures utilizing the present invention not to need replacement and not even to show wear even after extended periods of nearly continuous running.

Thus there has been described an apparatus for starting a tape and bringing it to a high operating velocity (e.g., 150 inches per second) within a time period of three milliseconds, the structure including means by which a pinch roller is rotated faster than a capstan so as to give up excess rotational energy to the tape upon engagement to accelerate the tape to operating velocity; and the pinch roller being engaged by means of an electrical coil that is energized during the first half of the roller motion to accelerate the roller toward engaged position, the motion of the roller being braked during the last half of the motion by means of a spring, and the coil being re-energized at the instant of engagement so as to clamp the roller to the tape and capstan.

What is claimed is:

1. Apparatus for bringing a movable member into pressurized engagement with another element, comprising: means for applying a first force to said member for causing movement of said member toward said element for engagement therewith; and means for braking said member to bring said movement to an end at the instant of said engagement; said first-named means being operable for applying a second force to said member at the instant of said engagement to hold said member in said pressurized engagement with said element.

2. Apparatus for bringing a movable member into pressurized engagement with another element, comprising: means for applying an impulse to cause movement of said member toward said element for engagement therewith; said moving impulse being of predetermined duration less than the time needed for said member to arrive at said engagement; and means for braking said member to bring said movement to an end at the instant of said engagement; said first-named means being operable for applying pressure to said member at the instant of said engagement to hold said member in said pressurized engagement with said element.

3. Apparatus for bringing a movable member into pressurized engagement with another element, comprising: means for applying an impulse to cause movement of said member toward said element for engagement therewith, said moving impulse being of predetermined duration less than the time needed for said member to arrive at said engagement; and spring means coupled to said member for opposing said movement and for bringing said movement to an end at the instant of said engagement; said first-named means being operable for applying pressure to said member at the instant of said engagement to hold said member in said pressurized engagement with said element against the force of said spring means.

4. In a tape transport, an apparatus for causing a pinch roller and a driven capstan to initiate and maintain high speed longitudinal movement of a tape disposed therebetween, comprising: means for driving said pinch roller at a greater peripheral velocity than said capstan; means for applying a force to cause movement of said pinch roller from a retracted position toward said capstan for engagement with said tape and capstan; and means for braking said pinch roller to bring said movement to an end at the instant of said engagement; said force applying means being operable for applying pressure to said pinch roller at the instant of said engagement to hold said pinch roller in said engagement with said tape and capstan.

5. In a tape transport, an apparatus for causing a pinch roller and a driven capstan to initiate and maintain high speed longitudinal movement of a tape disposed therebetween, comprising: means for slip driving said pinch roller at a greater peripheral velocity than said capstan; means for applying a force to cause movement of said pinch roller from a retracted position toward said capstan for engagement with said tape and capstan; means for braking said pinch roller to bring said movement to an end at the instant of said engagement; said force applying means being operable for applying pressure to said pinch roller at the instant of said engagement to hold said pinch roller in said engagement with said tape and capstan, whereby said pinch roller is caused to slip with respect to said drive means and to slow down to the same peripheral velocity as said capstan, thereby giving up energy to accelerate said tape quickly to said peripheral velocity of said capstan.

6. Apparatus as characterized in claim 5 wherein said slip driving means includes an idler mounted in axial parallelism with said capstan; an elastic belt tightly looped around said idler and said capstan and driven by said capstan; a drum of smaller diameter than said pinch roller, said drum being mounted coaxially with said pinch roller for driving said roller, and said drum engaging said belt in all positions of said pinch roller, whereby said pinch roller is continuously driven by said capstan at a greater peripheral velocity than said capstan when said pinch roller is in a retracted position, but is driven at the same peripheral velocity as said capstan when in an engaged position therewith.

7. Apparatus as characterized in claim 5 and also including: a magnetic armature coupled to said pinch roller for movement therewith, said armature being mounted for motion between retracted and engaged positions of said pinch roller; and an electrical coil mounted adjacent to said armature for attracting said armature thereto and to said engaged position of said pinch roller; said braking means comprising a spring coupled to said armature and roller and urging said armature and roller to said retracted position of said roller; said roller moving means comprising means for energizing said coil to apply to said armature a high-acceleration attracting impulse of duration less than the time required for said engaging movement of said roller and of strength just sufficient to move said roller against the tension of said spring to said position of engagement; and said roller pressure means comprising means for re-energizing said coil in timed relation subsequent to said impulse to attract said armature at the instant of said engagement and to thereafter hold said armature and said roller in said engaged position.

8. In a tape transport, an apparatus for causing a pinch roller and a driven capstan to initiate and maintain high speed longitudinal movement of a tape disposed therebetween, comprising: a yoke mounting said pinch roller for axial revolution, a shaft affixed to and mounting said yoke for swinging movement about the axis of said shaft and in a plane normal to the axis of said roller to and between positions of engagement with and retraction from said capstan; an elongated magnetic armature coupled to said shaft for rotation therewith in a plane normal to said shaft; an electrical coil mounted adjacent to said armature for attracting said armature thereto and to said engaged position of said pinch roller; a spring coupled to said armature, shaft and yoke and urging said armature, shaft and yoke to said retracted position of said roller; means for energizing said coil to apply to said armature a high-acceleration attracting impulse of duration less than the time required for said engaging movement of said roller and of strength just sufficient to move said roller against the tension of said spring to a position of engagement with said tape and capstan; means for re-energizing said coil in timed relation subsequent to said impulse to attract said member at the instant of said engagement and to thereafter hold said member and said roller in said engaged position; means coupled to said coil energizing means for operation thereof in said predetermined time sequence; an idler mounted in axial parallelism with said capstan; an elastic belt tightly looped around said idler and said capstan and driven by said capstan; a drum of smaller diameter than said pinch roller, said drum being mounted coaxially with said pinch roller for driving said roller, and said drum engaging said belt in all positions of said pinch roller, whereby said pinch roller is continuously driven by said capstan at a greater peripheral velocity than said capstan when said pinch roller is in a retracted position, but is driven at the same peripheral velocity as said capstan when in an engaged position therewith.

References Cited in the file of this patent

UNITED STATES PATENTS

| | | |
|---|---|---|
| 2,864,609 | Trimble | Dec. 16, 1958 |
| 2,877,012 | Angel et al. | Mar. 10, 1959 |
| 2,905,871 | Martin | Sept. 22, 1959 |
| 2,947,516 | Jackson | Aug. 2, 1960 |